US008064875B2

(12) United States Patent
Velazquez et al.

(10) Patent No.: US 8,064,875 B2
(45) Date of Patent: Nov. 22, 2011

(54) METHODS AND APPARATUS TO UPDATE GEOGRAPHIC LOCATION INFORMATION ASSOCIATED WITH INTERNET PROTOCOL DEVICES FOR E-911 EMERGENCY SERVICES

(75) Inventors: Leonardo Velazquez, Aurora, IL (US); Sudha Gopal, Plano, TX (US); Adam Lee Klein, Cedar Park, TX (US); Sandra C. Lenhart, Dripping Springs, TX (US); Stephen Rys, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 371 days.

(21) Appl. No.: 11/462,576

(22) Filed: Aug. 4, 2006

(65) Prior Publication Data

US 2008/0125077 A1 May 29, 2008

(51) Int. Cl.
H04M 11/04 (2006.01)
(52) U.S. Cl. ...... 455/404.2; 370/352; 370/356; 370/395.5; 370/466; 370/467; 455/403; 455/414.2; 455/432.2
(58) Field of Classification Search .......... 379/60, 379/88.19, 45, 399.02; 370/352, 356, 395.5, 370/466, 467; 455/403, 404.2, 414.2, 432.2
See application file for complete search history.

(56) References Cited

U.S. PATENT DOCUMENTS

| 5,161,180 | A | 11/1992 | Chavous |
| 5,235,630 | A | 8/1993 | Moody et al. |
| 5,347,568 | A | 9/1994 | Moody et al. |
| 5,479,482 | A | 12/1995 | Grimes |
| 6,415,019 | B1 | 7/2002 | Savaglio et al. |
| 6,421,009 | B2 | 7/2002 | Suprunov |
| 6,650,901 | B1 | 11/2003 | Schuster et al. |
| 6,678,357 | B2 | 1/2004 | Stumer et al. |
| 6,707,888 | B1 | 3/2004 | Cope |

(Continued)

FOREIGN PATENT DOCUMENTS

EP 1337089 A 8/2003

(Continued)

OTHER PUBLICATIONS

National Emergency Number Association (NENA) Technical Committee Chairs, Interim VoIP Architecture for Enhanced 9-1-1 Services (i2), NENA Template for Creating or Updating E9-1-1 Standards Documents, Issue 1 Draft, Aug. 5, 2005, pages all.

(Continued)

Primary Examiner — Curtis Kuntz
Assistant Examiner — Yosef K Laekemariam
(74) Attorney, Agent, or Firm — Hanley, Flight and Zimmerman, LLC

(57) ABSTRACT

Example methods and apparatus to enable 911 services to an internet protocol ("IP") communication device are disclosed. A disclosed example method involves receiving a media access control address associated with the IP communication device and a first internet protocol address associated with a gateway through which the IP communication device is obtaining network access. A second internet protocol address associated with the media access control address is then retrieved. The first internet protocol address with the second internet protocol address are then compared. When the first internet protocol address does not match the second internet protocol address, the media access control address is associated with the first internet protocol address in a database to designate a geographic location of the device.

21 Claims, 10 Drawing Sheets

U.S. PATENT DOCUMENTS

| | | | |
|---|---|---|---|
| 6,771,742 B2 | 8/2004 | McCalmont et al. | |
| 6,799,049 B1 | 9/2004 | Zellner et al. | |
| 6,807,483 B1 | 10/2004 | Chao et al. | |
| 6,927,727 B2 | 8/2005 | Cleghorn | |
| 6,940,950 B2 | 9/2005 | Dickinson et al. | |
| 7,027,564 B2 | 4/2006 | James | |
| 7,042,985 B1 | 5/2006 | Wright | |
| 7,079,627 B2 | 7/2006 | Crago et al. | |
| 7,103,034 B1 * | 9/2006 | Srinivas et al. | 370/352 |
| 7,130,385 B1 | 10/2006 | Moon | |
| 7,260,186 B2 | 8/2007 | Zhu et al. | |
| 7,480,933 B2 * | 1/2009 | Bush et al. | 726/4 |
| 7,639,792 B2 | 12/2009 | Qiu et al. | |
| 7,773,975 B2 | 8/2010 | Snapp et al. | |
| 2001/0022558 A1 | 9/2001 | Karr, Jr. et al. | |
| 2003/0146871 A1 | 8/2003 | Karr et al. | |
| 2003/0217122 A1 | 11/2003 | Roese et al. | |
| 2003/0222819 A1 | 12/2003 | Karr et al. | |
| 2003/0222820 A1 | 12/2003 | Karr et al. | |
| 2004/0057425 A1 | 3/2004 | Brouwer et al. | |
| 2004/0125923 A1 | 7/2004 | See et al. | |
| 2004/0151283 A1 | 8/2004 | Lazoff | |
| 2004/0198386 A1 | 10/2004 | Dupray | |
| 2004/0266457 A1 | 12/2004 | Dupray | |
| 2005/0026650 A1 | 2/2005 | Russell | |
| 2005/0063519 A1 | 3/2005 | James | |
| 2005/0074008 A1 | 4/2005 | Herledan et al. | |
| 2005/0083911 A1 | 4/2005 | Grabelsky et al. | |
| 2005/0090225 A1 | 4/2005 | Muehleisen et al. | |
| 2005/0135569 A1 | 6/2005 | Dickinson et al. | |
| 2005/0141431 A1 | 6/2005 | Caveney et al. | |
| 2005/0153681 A1 | 7/2005 | Hanson | |
| 2005/0175166 A1 | 8/2005 | Welenson et al. | |
| 2005/0190892 A1 | 9/2005 | Dawson et al. | |
| 2005/0213716 A1 | 9/2005 | Zhu et al. | |
| 2005/0232164 A1 | 10/2005 | Anzarouth et al. | |
| 2005/0265326 A1 | 12/2005 | Laliberte | |
| 2006/0039539 A1 | 2/2006 | Goldman et al. | |
| 2006/0056388 A1 | 3/2006 | Livingood | |
| 2006/0068753 A1 | 3/2006 | Karpen et al. | |
| 2006/0120517 A1 * | 6/2006 | Moon et al. | 379/45 |
| 2006/0133354 A1 | 6/2006 | Lee | |
| 2007/0058615 A1 | 3/2007 | Hasenfang et al. | |
| 2007/0104183 A1 * | 5/2007 | Bakke et al. | 370/352 |
| 2007/0115935 A1 | 5/2007 | Qiu et al. | |
| 2007/0127452 A1 * | 6/2007 | Croy | 370/356 |
| 2007/0147345 A1 | 6/2007 | Lowmaster | |
| 2007/0201622 A1 * | 8/2007 | Croak et al. | 379/37 |
| 2007/0230440 A1 | 10/2007 | Joong et al. | |
| 2007/0280213 A1 | 12/2007 | Sindhwani et al. | |
| 2008/0008179 A1 * | 1/2008 | Chen et al. | 370/392 |
| 2008/0101552 A1 | 5/2008 | Khan et al. | |
| 2008/0200143 A1 | 8/2008 | Qiu et al. | |

FOREIGN PATENT DOCUMENTS

| | | |
|---|---|---|
| EP | 1337089 A3 | 3/2004 |
| EP | 1589721 A | 10/2005 |
| WO | 2005104518 | 11/2005 |
| WO | 2006023190 | 3/2006 |
| WO | WO 2007056186 | 5/2007 |

OTHER PUBLICATIONS

AT&T, AT&T Business Service Guide, AT&T Business Voice over IP (BVoIP) Services, Sep. 22, 2006, 40 pages.

Frost & Sullivan, U.S. E9-1-1 Market Insight 6847-63, www.frost.com, 2003, pages all.

International Searching Authority, Invitation to Pay Additional Fees and Partial International Search for International application No. PCT/US2008/051141, Jan. 27, 2009, 5 pages.

Patent Cooperation Treaty, "International Search Report," issued by the International Searching Authority in connection with related PCT application No. PCT/US2008/051141, mailed Mar. 27, 2009 (6 pages).

Patent Cooperation Treaty, "Written Opinion of the International Searching Authority," issued by the International Searching Authority in connection with related PCT application No. PCT/US2008/051141, mailed Mar. 27, 2009 (11 pages).

International Bureau, "International Preliminary Report on Patentability," issued in connection with PCT application Serial No. PCT/US2008/051141, issued Aug. 26, 2009 (13 pages).

E. Gabber et al., "On Location-Restricted Services", IEEE Network, Nov./Dec. 1999, pp. 44-52.

Akundi et al., "i2 Solution Overview," Nortel Networks, Mar. 2005 (15 pages).

Cauley, "AT&T solves VoIP's 911 issue," USA Today, Oct. 10, 2005 (2 pages) [retrieved at http://www.usatoday.com/tech/news/techinnovations/2005-10-10-voip-att_x.htm].

"CCS/SS7 Generic Requirements in Support of E9-1-1 Service," Telecordia, Dec. 2002 (3 pages).

"CCS/SS7 Generic Requirements in Support of E9-1-1 Service Contents," GR-2956-Core, Dec. 2002 (3 pages).

Rosenberg et al., "SIP: Session Initiation Protocol," RFC 3261, Network Working Group, Jun. 2002 (269 pages), [retrieved via Internet at http://www.ietf.org/rfc/rfc3261.txt].

Rosenberg et al., "Reliability of Provisional Responses in the Session Initiation Protocol (SIP)," RFC 3262, Network Working Group, Jun. 2002 (14 pages), [retrieved via Internet at http://www.ietf.org/rfc/rfc3262.txt].

Rosenberg et al., "Session Initiation Protocol (SIP): Locating SIP Servers," RFC 3263, Network Working Group, Jun. 2002 (17 pages),[retrieved via Internet at http://www.ietf.org/rfc/rfc3263.txt].

Rosenberg et al., "An Offer/Answer Model with the Session Description Protocol (SDP)," RFC 3264, Network Working Group, Jun. 2002 ( 25 pages),[retrieved via Internet at http://www.ietf.org/rfc/rfc3264.txt].

* cited by examiner

| GEOGRAPHIC STREET ADDRESS | SITE GATEWAY ID | TELEPHONE NUMBER | SITE GATEWAY IP ADDRESS | VoIP DEVICE MAC ADDRESS |
|---|---|---|---|---|
| 324 ELMWOOD DRIVE, CHICAGO, IL 60000 | 01-48-11-25-32-ab | 312.555.555 | 68.102.51.28 | 01-52-25-87-22-ab |
| 125 HILL COURT, SPRINGFIELD, IL 62700 | 01-94-58-78-21-ef | 217.555.555 | 68.72.106.50 | 01-23-55-01-28-ab |

STORED IN LIS DATABASE 116 (FIG. 1) { columns: GEOGRAPHIC STREET ADDRESS, SITE GATEWAY ID, TELEPHONE NUMBER }

STORED IN LDAP SERVER 140 (FIG. 1) { columns: SITE GATEWAY IP ADDRESS, VoIP DEVICE MAC ADDRESS }

FIG. 5

METHODS AND APPARATUS TO UPDATE GEOGRAPHIC LOCATION INFORMATION ASSOCIATED WITH INTERNET PROTOCOL DEVICES FOR E-911 EMERGENCY SERVICES

FIELD OF THE DISCLOSURE

The present disclosure relates generally to communications systems and, more particularly, to methods and apparatus to update geographic location information associated with Internet protocol devices for E-911 emergency services.

BACKGROUND

Telecommunication providers in the United States are required by the Federal Communications Commission ("FCC") to support 911 emergency call services. That is, when a telephone user dials 9-1-1, the telecommunication carrier must be able to process the call to determine the geographic location from where the call is originated to enable dispatching emergency personnel to the location of the 911 caller. In traditional public switched telephony networks ("PSTN"), the geographic information retrieval support for 911 is implemented by fixing associations between wireline telephone numbers and geographic street addresses. Telecommunication providers usually store a subscriber's location (e.g., a street address) in a database associated with an assigned telephone number (e.g., a call back number ("CBN")) during the service activation. When a PSTN user makes a 911 call, the calling telephone number (i.e., the CBN) of the incoming 911 call can be used to look up the geographic location of the caller, and the retrieved location information can be used to dispatch emergency personnel to the caller.

The introduction of Voice over IP ("VoIP") technology introduces various challenges to service providers to support 911 services. In particular, under a roaming service, a VoIP subscriber can easily disconnect a VoIP telephone from one location (e.g., the subscriber's home or workplace), connect the VoIP telephone in another location (e.g., a visited local area network ("LAN"), a coffee shop, a vacation spot, etc.), and register the VoIP telephone with the VoIP service provider to place telephone calls from the other location. This roaming capability of VoIP phones eliminates the dedicated or fixed association between telephone numbers and physical or geographic locations.

BRIEF DESCRIPTION OF THE DRAWINGS

FIG. 5 depicts an example table showing association between site gateway identifications, geographic street addresses, subscriber telephone numbers, site gateway IP addresses, and VoIP device MAC addresses.

DETAILED DESCRIPTION

Figure 1:
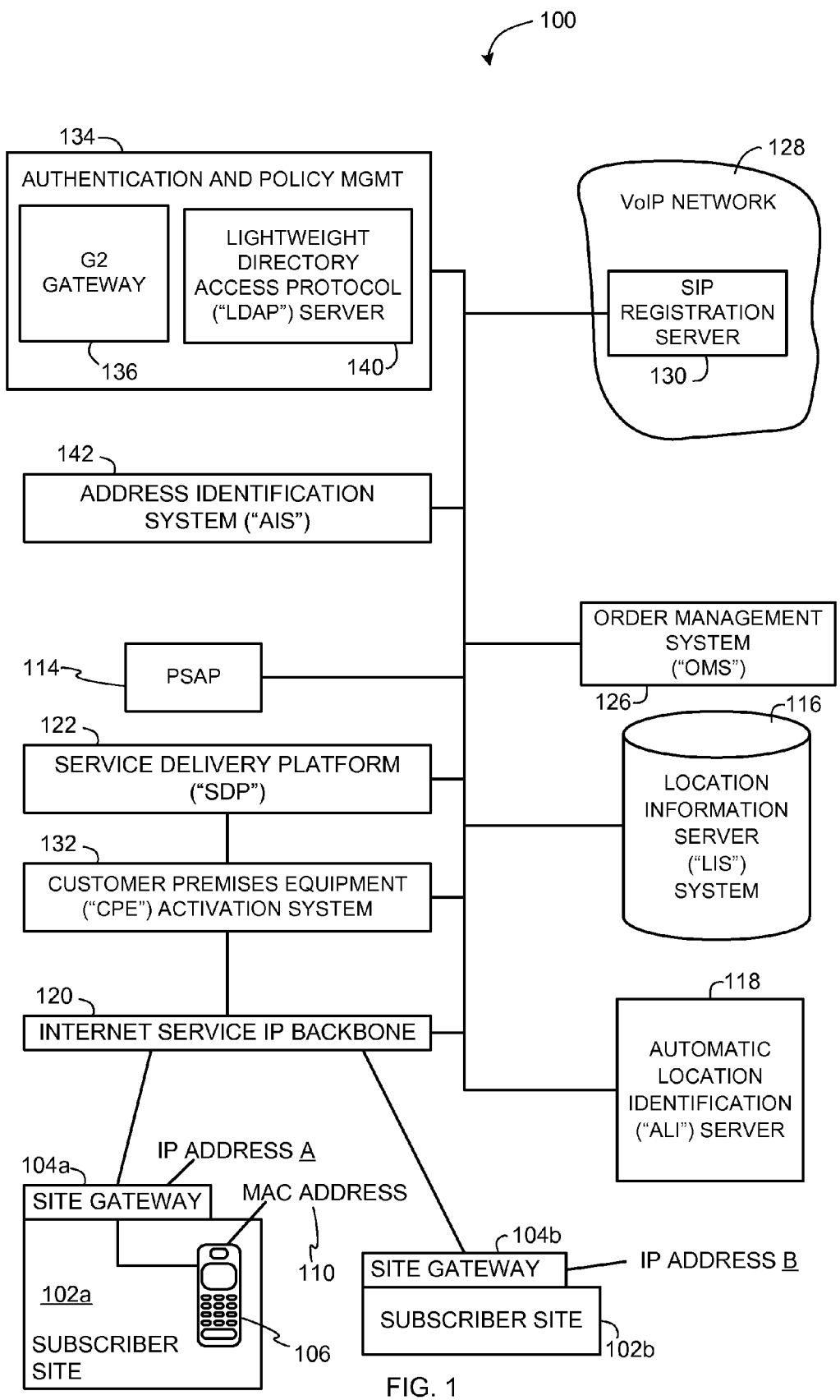
FIG. 1 depicts an example network system that may be used to implement the example methods and apparatus described herein.

The example methods and apparatus described herein may be used to enable E-911 services for roaming internet protocol ("IP") communication devices. Traditional 911 services based on the plain old telephone system ("POTS") standard provide POTS telephone service subscribers with emergency service that is capable of pinpointing the geographic calling location of a caller. In this manner, although a caller may be unable to speak into the telephone, the receiving 911 dispatcher can obtain the immediate address or geographic location from which the caller is calling and dispatch emergency personnel to that location. Unlike traditional POTS telephone service, which is implemented in connection with traditional wireline telephone numbers that are tied to a particular geographic location (e.g., a subscriber's home), IP communication services (e.g., voice over IP ("VoIP") service) do not always restrict an IP telephone number to being permanently associated with or assigned to a particular geographic location. Instead, some VoIP service providers enable a VoIP device associated with a particular telephone number to roam through a service provider network. That is, a subscriber may disconnect a VoIP device from the service provider network at a first location (e.g., the subscriber's home) and reconnect the VoIP device into the service provider network at a second location (e.g., a work place). As described herein, E-911 roaming enables a service provider network to provide E-911 services to subscribers even though subscribers may move their VoIP devices between various locations. As described in greater detail below, example methods and apparatus described herein enable such roaming by automatically updating a registered geographic location associated with a VoIP device of a subscriber whenever the subscriber connects the VoIP device to an IP service provider network. The VoIP device may be, for example, an IP telephone for voice over IP communications or a computer or other processing device (e.g., a portable communicator, etc.) for VoIP or other communications (e.g., messaging) over IP. A network service provider providing services for the VoIP device may be a telephone company, a cable company, a satellite company, an Internet service provider, a utility (e.g., electricity) service provider, etc.

In a disclosed example method to enable E-911 roaming, a customer premises equipment ("CPE") activation system receives a media access control ("MAC") address associated with a VoIP device (e.g., a VoIP telephone) and a first IP address associated with a gateway. The CPE activation system then determines whether the MAC address is valid and, if valid, retrieves a second IP address associated with the MAC address from a location identification server ("LIS") database and compares the first IP address with the second IP address.

Typically, when the first IP address does not match the second IP address, the first IP address is associated with a first geographic location and the second IP address is associated with a second geographic location (and possibly a second gateway associated with the second geographic location) different from the first geographic location. Thus, the geographic location of the VoIP device is no longer correct in the LIS database. Therefore, when the first IP address does not match the second IP address, the CPE activation system generates and sends a request to update the geographic location of the IP communication device to the LIS. The request causes the MAC address of the VoIP device to be associated with the first IP address in the LIS database thereby designating an updated geographic location of the VoIP device.

Updating the LIS database to include the most recent or current geographic location of the VoIP device enables E-911 dispatchers to send emergency assistance to the geographic location at which the VoIP device is located, should an emergency call be placed from that VoIP device. For example, in response to an E-911 call from the VoIP device, an automatic location identification ("ALI") system accesses the LIS to retrieve the geographic location of the VoIP device and provides the geographic location information to an emergency dispatcher handling the E-911 call. The dispatcher can then send appropriate emergency service personnel to the location of the VoIP device.

The gateway associated with the first IP address may be a site gateway (e.g., a residential gateway) used to communicatively couple the VoIP device to a service provider network. For example, the gateway may be installed at a place of business (e.g., a subscriber's workplace or office), a subscriber's home, a retail establishment (e.g., a coffee shop) offering Internet access, etc. In some example implementations, the gateway may be implemented using a network router or may be implemented in combination with a network router or other network interface device.

In some example implementations, the LIS database is located external to a virtual local area network ("LAN") and/or an IP private branch exchange ("PBX") system within which the VoIP device is communicatively coupled to the gateway. Also in some example implementations, the example method determines whether the VoIP device is eligible for association with a geographic location within which it is located. For instance, if the CPE activation system determines that the VoIP device is associated with a non-roaming account and has already been associated with a geographic location, the CPE activation system may prevent the VoIP device from being associated with a new geographic location.

Some example network systems that enable E-911 roaming are configured to receive a MAC address associated with a VoIP device, determine whether the MAC address is stored in a data structure (e.g., the LIS database), and when the MAC address is stored in the data structure, to associate the MAC address with an IP address associated with a geographic location in which the VoIP device is currently located. The IP address is associated with a network access device (e.g., a gateway) communicatively coupled to the VoIP device that enables the VoIP device to communicate with a service provider network.

Alternatively or additionally, some example network systems retrieve a second IP address associated with the MAC address from the LIS database and compare the second IP address with the IP address corresponding to the network access device (e.g., the gateway). When the IP addresses do not match, the example network systems associate the MAC address with the IP address in the LIS database to associate the VoIP device with a current geographic location of the VoIP device.

In some example implementations, the network system determines whether the VoIP device is eligible for association with the geographic location and, based on such determination, the network system determines whether to prevent the VoIP device from being associated with a new geographic location.

As will be readily apparent to one of ordinary skill in the art, the example methods, apparatus, and systems described herein may be implemented using instructions stored on one or more machine accessible media (e.g., a CD-ROM, a magnetic storage device, an optical storage device, a solid-state storage device, etc.) associated with one or more network system devices. In this manner, the machine accessible media may be used to enable network system devices to retrieve and execute the instructions to implement the example methods, apparatus, and systems described herein.

The example network system 100 of FIG. 1 includes subscriber sites 102a and 102b, each having a respective subscriber site gateway 104a and 104b (e.g., a residential gateway). The subscriber sites 102a-b may be residential dwellings and/or business sites (e.g., a coffee shop, an education facility, an office, an industrial building, etc.), and may have separate respective LAN's and/or PBX's located therein which are communicatively coupled to a respective one of the site gateways 104a-b. In the illustrated example, the site gateways 104a and 104b are used to provide access to the example network system 100 and may be implemented using wire-interface gateways (e.g., wired Ethernet, IEEE-802.3, Universal Serial Bus ("USB"), etc.) or wireless gateways (e.g., wireless Ethernet, IEEE-802.11, Wi-Fi®, Bluetooth®, etc.).

In the illustrated example, an IP communication device 106 (e.g., a wireline or wireless VoIP telephone, a plain old telephone system ("POTS") analog telephone connected to an analog telephone adapter ("ATA"), a wireline or wireless IP data/voice communicator, a personal desktop, laptop, or tablet computer having VoIP capabilities, etc.) is communicatively coupled to the subscriber site gateway 104a. The site gateway 104a provides the IP communication device 106 network access to the example network system 100, and the IP communication device 106 is capable of making VoIP calls via the example network system 100. For purposes of discussion, the IP communication device 106 will be referred to herein as a VoIP device 106. Although two subscriber sites (i.e., the subscriber sites 102a-b) and two site gateways (i.e., the site gateways 104a-b) are shown in FIG. 1, any number of subscriber sites and site gateways may be used in connection with the examples described herein.

As shown in the illustrated example of FIG. 1, the first site gateway 104a is assigned an IP address A and the second site gateway 104b is assigned an IP address B. The IP addresses A and B may be dynamic IP addresses or static IP addresses assigned by, for example, a Dynamic Host Configuration Protocol ("DHCP") server (not shown) of an Internet service provider. Also, as shown in the illustrated example of FIG. 1, the VoIP device 106 is associated with a MAC address 110. The MAC address 110 is unique and may be used to identify the VoIP 106 when it is communicatively coupled to the example network system 100. In alternative example implementations, a device serial number or identification number may be used instead of a MAC address to uniquely identify the VoIP device 106.

Figure 2:
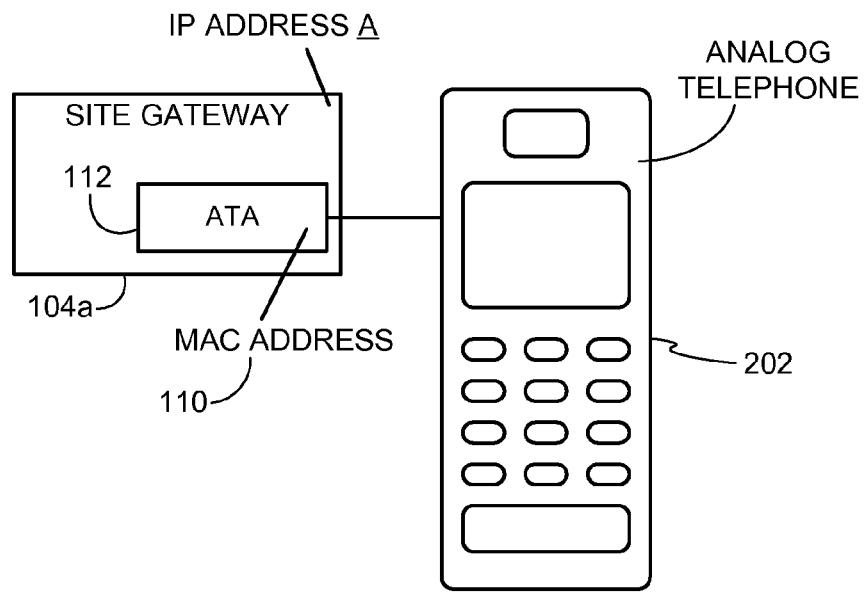
FIG. 2 is an example analog telephone communicatively coupled to an analog telephone adapter.

FIG. 2 depicts an example implementation that may be used to implement the example VoIP device 106 using a POTS analog telephone 202 communicatively coupled to an analog telephone adapter ("ATA") 112 within the site gateway 104a. The ATA 112 enables the VoIP device 106 to interface and operate with an IP network by converting analog voice signals to digital voice signals and packetizing the digital voice signals for communication over an IP network. In the illustrated example of FIG. 2, the ATA 112 stores the MAC address 110 therein and is uniquely identified by the MAC address 110. In other example implementations, a device serial number or other unique identification number associated with the ATA 112 may be used to uniquely identify the ATA 112. Although the ATA 112 is shown within the site gateway 104 in FIG. 2, in alternative example implementations, the ATA 112 may be separate from the site gateway 104a and communicatively coupled to the site gateway 104a and the VoIP device 106.

Figure 3:
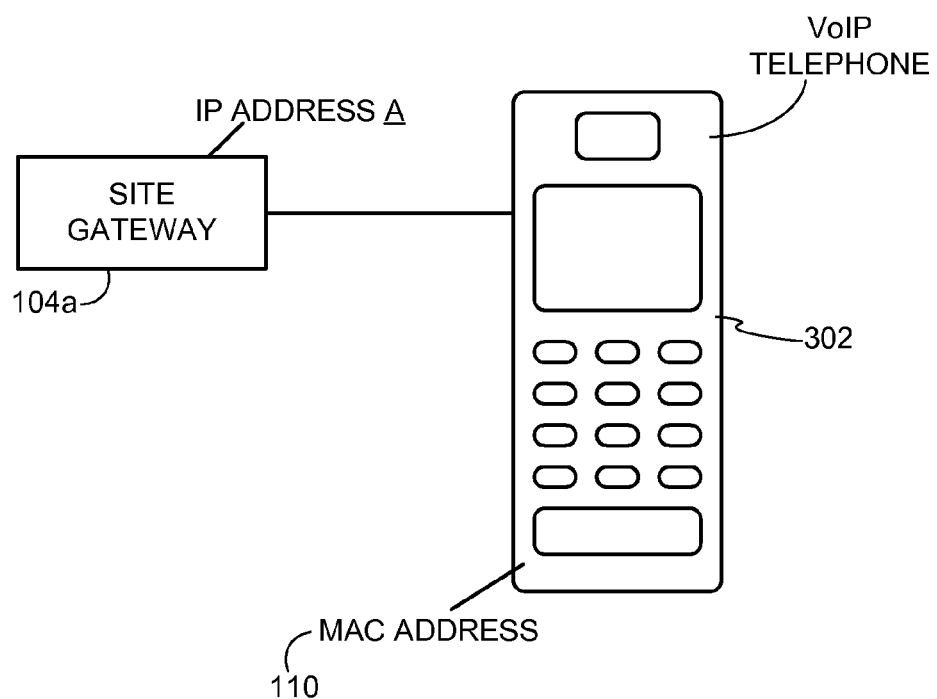
FIG. 3 is an example VoIP telephone coupled to a site gateway.

FIG. 3 depicts another example implementation for implementing the VoIP device 106. In the illustrated example, the VoIP device 106 is implemented using a VoIP telephone 302 (e.g., a session initiation protocol ("SIP") telephone) that connects to the site gateway using, for example, an Ethernet connection or some other network communication connection (e.g., a wireless Ethernet connection, a Bluetooth® connection, etc.). The VoIP telephone 302 includes integrated circuitry to implement VoIP communications by, for example, generating and decoding digital voice signals and communicating the digital voice signals to the site gateway 104a, thus, eliminating the need for a separate ATA (e.g., the ATA 112). In the illustrated example of FIG. 3, the MAC address 110 is associated with (e.g., stored in) and uniquely identifies the VoIP telephone 302. In other example implementations, a device serial number or other unique identification number associated with the VoIP telephone 302 may be used to uniquely identify the VoIP telephone 302.

Although the example methods and apparatus described herein may be implemented using a SIP telephone (e.g., the VoIP telephone 302 of FIG. 3) or an ATA/analog telephone configuration as shown in FIG. 2, for purposes of discussion, the example methods and apparatus are described below based on the configuration of FIG. 2 using the ATA 112.

Returning now to the illustrated example of FIG. 1, the example network system 100 is communicatively coupled to a public safety answering point ("PSAP") 114. The 911 dispatchers at the PSAP 114 receive and handle 911 calls originating in the geographic area corresponding to the PSAP 114. A 911 emergency network includes a plurality of PSAP's similar to the PSAP 114. Each of the PSAP's in the 911 emergency network corresponds to a particular geographic area and handles 911 calls originating within that geographic area. In this manner, 911 dispatchers can dispatch emergency service personnel from a location nearest the geographic location of the 911 caller.

The example network system 100 also includes a location information server ("LIS") system 116, which includes one or more data structures (e.g., databases) for storing geographic addresses in association with telephone subscriber identification information. For example, the LIS system 116 may store a subscriber telephone number in association with the subscriber's geographic street address to enable retrieving the subscriber's geographic street address based on the subscriber's telephone number. In the illustrated example, the LIS system 116 also associates a site gateway identification ("ID") with a geographic location (e.g., a geographic street address) of a corresponding site gateway (e.g., one of the site gateways 104a and 104b).

To retrieve geographic location information from the LIS system 116 and communicate the geographic location information to the PSAP 114 during a 911 call, the example network system 100 includes an automatic location identification ("ALI") server 118. During a 911 call from a VoIP device (e.g., the VoIP device 106), the PSAP 114 forwards a request for a caller's geographic location information to the ALI server 118. The request includes one or both of the telephone number of the VoIP device 106 and the MAC address of the VoIP device 106. In response, the ALI server 118 accesses the LIS system 116, retrieves the geographic street address associated with the telephone number and/or the MAC address of the VoIP device 106, and forwards the geographic address to the PSAP 114.

To enable the VoIP device 106 to communicate with the VoIP network 108, the example network system 100 includes an Internet service IP backbone 120 that provides access to Internet or network services other than VoIP services (e.g., World Wide Web services, e-mail services, IP television services, etc.). The example network system 100 also includes a service delivery platform ("SDP") 122 that integrates various communication services including broadband Internet access, video delivery, wireless communications, wireline communications, etc. to enable delivering those various services to customers via one communication system (e.g., the example network system 100).

To manage service ordering activities, the example network system 100 is provided with an order management system ("OMS") 126. Customer service representatives, sales representatives, and/or on-line ordering interfaces can access the OMS 126 to process customer orders to provision or cancel services. The OMS 126 provides order management, product/service definition, order tracking, order fulfillment, and/or notifications. For example, the OMS 126 may define whether a subscriber's VoIP device (e.g., the VoIP device 106) is capable of roaming to different parts of the service provider's network. In some example implementations, a subscriber's VoIP device that is not provided with a roaming feature will be denied service if connected to the service provider's network at any location other than a pre-determined "home" location.

In the illustrated example of FIG. 1, the example network system 100 includes a VoIP network 128 to provide VoIP communication services. To manage subscriber services, the VoIP network 128 is provided with a session initiation protocol ("SIP") registration server 130. In the illustrated example, the SIP registration server 130 is configured to manage and track which subscribers have subscribed to which features or services and to enable access to those features by subscribers. To implement a service change (e.g., provisioning, a device registration, an upgrade, an update, etc.), the SIP registration server 130 is notified of the service change, and the SIP registration server 130 stores information indicative of the service change. The SIP registration server 130 also manages information related to registering a VoIP device (e.g., the VoIP device 106) on a network and tracking where the VoIP device is located on the network so that calls, messages, or other information can be routed to the VoIP device. In some example implementations, the SIP registration server 130 may be implemented using a Lucent session manager.

To activate subscriber IP devices (e.g., the VoIP device 106) when they are connected to the example network system 100, the example network system 100 is provided with a customer premises equipment ("CPE") activation system 132. The CPE activation system 132 stores configuration information related to the configuration of each subscriber IP device connected to site gateways (e.g., the site gateways 104a-b) corresponding to the CPE activation system 132. In the illustrated example, the CPE activation system 132 stores configuration information for the VoIP device 106 using, for example, a data structure, a configuration file (e.g., the example configuration file 400 of FIG. 4), etc. The CPE activation system 132 (e.g., a configuration information provider) communicates the configuration information to the VoIP device 106. The configuration information provides the VoIP device 106 with information (e.g., network information) that the VoIP device 106 can use to configure itself for operation with the example network system 100 to, for example, access VoIP services.

Figure 4:
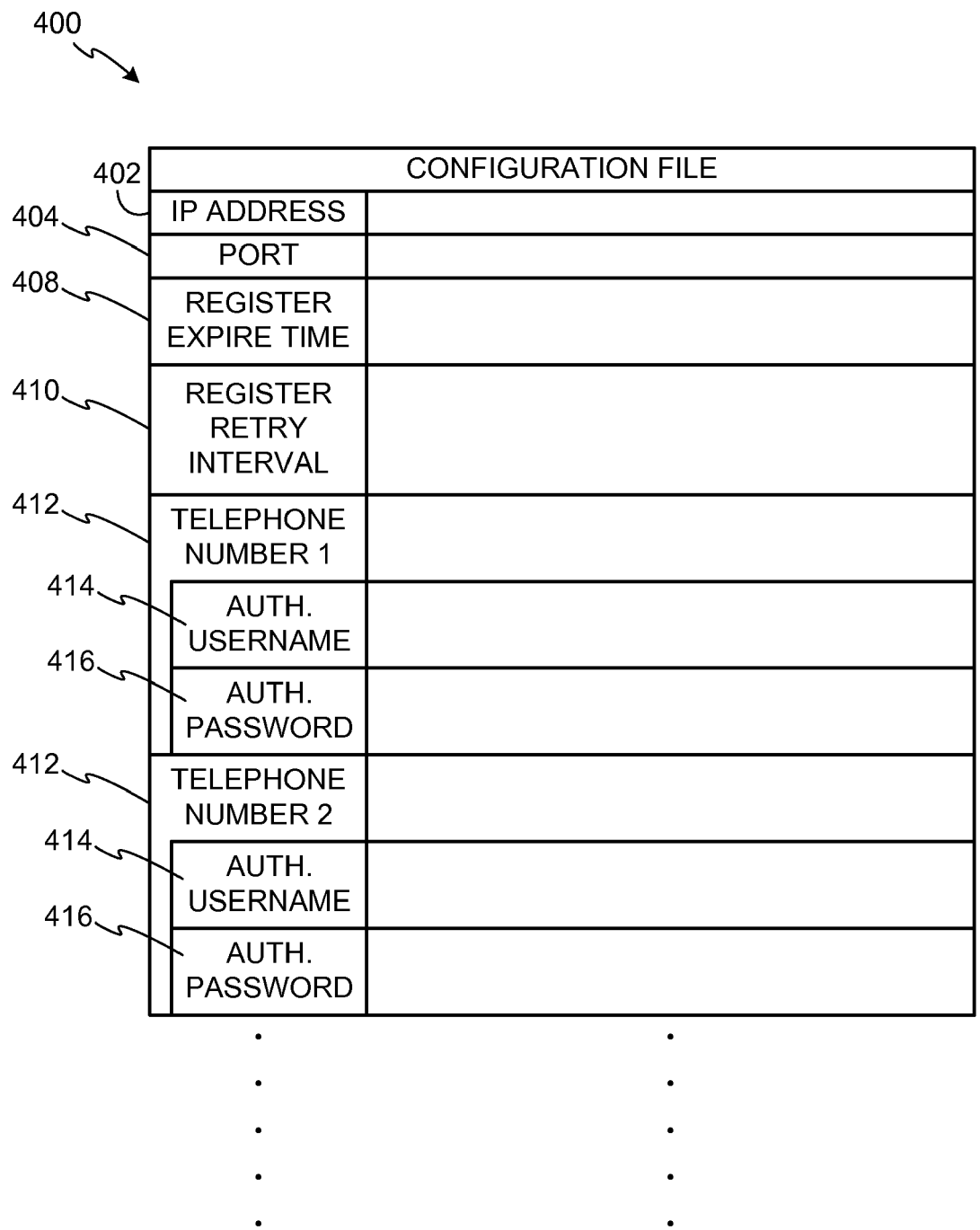
FIG. 4 depicts an example configuration file used to register a VoIP device onto a network.

An example configuration file 400 is illustrated in detail in FIG. 4. In the illustrated example, the example configuration file 400 includes an IP address field 402 of a corresponding session initiation protocol ("SIP") registration server (e.g., a session initiation protocol ("SIP") registration server 130 of FIG. 1). The example configuration file 400 also includes a port identification field 404 that indicates the destination port on the SIP registration server 130 with which to communicate to register a respective VoIP device.

A register expire time field 408 stores the amount of time that is provided to a device (e.g., the VoIP device 106 of FIG. 1) for completing a SIP registration process and a register retry interval field 410 stores the amount of time a device must wait before attempting to register again. To store telephone numbers and associated usernames and passwords for a device (e.g., the VoIP device 106 of FIG. 1), the example configuration file 400 is provided with one or more telephone number fields 412 and respective authentication username fields 414 and authentication password fields 416. Although the configuration information is described as being stored in a configuration file (e.g., the configuration file 400), the configuration information may alternatively be stored using any other type of data structure and may be communicated to the VoIP device 106 using a configuration file, individual information transmissions (e.g., variables, data records, etc.), application program interface ("API") calls/responses, packet header information, XML transactions, or in any other way.

Returning to FIG. 1, in the illustrated example, the example network system 100 includes an authentication and policy management system 134 to authenticate and validate VoIP devices (e.g., the VoIP device 106) that attempt to access the example network system 100. In particular, an authentication and policy management gateway ("G2 gateway") 136 within the authentication and policy management system 134 provides an interface to a lightweight directory access protocol ("LDAP") server 140. The LDAP server 140 may include one or more databases (e.g., data structures) and is implemented using a data access Internet protocol that may be used to search, find, and retrieve information stored in the one or more databases. In the illustrated example, the LDAP server 140 may store MAC addresses (e.g., the MAC address 110) of registered devices (e.g., the VoIP device 106). In this manner, the authentication and policy management system 134 may be used to authenticate or validate VoIP devices (e.g., the VoIP device 106) that are connected to the example network system 100 by, for example, storing the MAC addresses of valid VoIP devices (e.g., VoIP devices that have been registered and/or are eligible to access network services). The LDAP server 140 may also be used to store IP addresses of site gateways (e.g., the IP addresses A and B of the site gateways 104*a-b*) in association with respective MAC addresses of registered devices connected to those site gateways. In this manner, the authentication and policy management system 134 may be used to determine the site gateways (e.g., the site gateways 104*a-b*) to which VoIP devices are connected. In the illustrated example, to enable associating the information (e.g., MAC addresses and IP addresses) stored in the LDAP server 140 with respective information (e.g., geographical street addresses and site gateway ID's) stored in the LIS system 116 as shown in FIG. 5, each of the LIS system 116 and the LDAP server 140 may also store a primary key such as, for example, a subscriber telephone number and/or a site gateway identification.

FIG. 5 depicts an example relational table 500 (e.g., a relational data structure) that shows the relationships (e.g., the associations) between information stored in the LIS system 116 and information stored in the LDAP server 140. In particular, site gateway ID's stored by the LIS system 116 are illustrated in a site gateway ID field 502, geographic street addresses stored by the LIS system 116 are illustrated in a geographic street address field 504, and subscriber telephone numbers stored by the LIS system 116 are shown in a telephone number field 506.

In addition, site gateway IP addresses stored in the LDAP server 140 are illustrated in a site gateway IP address field 508, VoIP device MAC addresses stored in the LDAP server 140 are shown in a VoIP device MAC address field 510, the subscriber telephone numbers stored in the LDAP server 140 are shown in the telephone number field 506, and the site gateway ID's stored in the LDAP server 140 are shown in the site gateway ID field 502. In the illustrated example, the subscriber telephone numbers shown in the telephone number field 506 and/or the site gateway ID's shown in the site gateway ID field 502 may be used as primary keys that enable associating the information stored in the LIS system 116 with corresponding information in the LDAP server 140.

Example information in the relational table 500 includes an example site gateway ID 512 of a site gateway (e.g., a MAC address of the site gateway 104*a* of FIG. 1) through which a VoIP device (e.g., the VoIP device 106 of FIG. 1) is connected to the example network system 100 (FIG. 1) to access network services. The example site gateway ID 512 is shown in association with an example geographic street address 514 (e.g., geographic location information). The geographic street address 514 indicates the geographic location of the site gateway (e.g., the site gateway 104*a* of FIG. 1) corresponding to the site gateway ID 512. For example, if the site gateway corresponding to the site gateway ID 512 is a residential gateway located at a subscriber's home (e.g., the subscriber site 102*a* of FIG. 1), the geographic street address 514 is the street address of the subscriber's home.

To associate a VoIP device (e.g., the VoIP device 106 of FIG. 1) with a site gateway to which it is connected, the example table 500 stores an example media access control ("MAC") address 516 of the VoIP device in association with an example IP address 518 of the site gateway to which the VoIP device is connected. To associate the example geographic street address 514 with the example MAC address 516 and the example site gateway IP address 518, each of the LIS system 116 and the LDAP server 140 stores an example telephone number 520, which is used as a primary key. Additionally or alternatively, the example site gateway ID 512 stored in each of the LIS system 116 and the LDAP server 140 may be used as a primary key to associate the example geographic street address 514 with the example MAC address 516.

Returning to FIG. 1, to store geographic addresses in association with IP addresses of site gateways (e.g., the IP addresses A and B of the site gateways 104*a* and 104*b*), the example network system 100 is provided with an address identification system ("AIS") 142. The address identification system 142 includes one or more databases (e.g., data structures) that store the geographic locations indicating the locations of site gateways. In this manner, when the VoIP device 106 moves from one location to another, the geographic location of the VoIP device 106 can be retrieved based on the IP address of the site gateway through which the VoIP device 106 is connected to the example network system 100. The AIS 142 can be updated each time a new site gateway is connected to the example network system 100.

Figure 6:
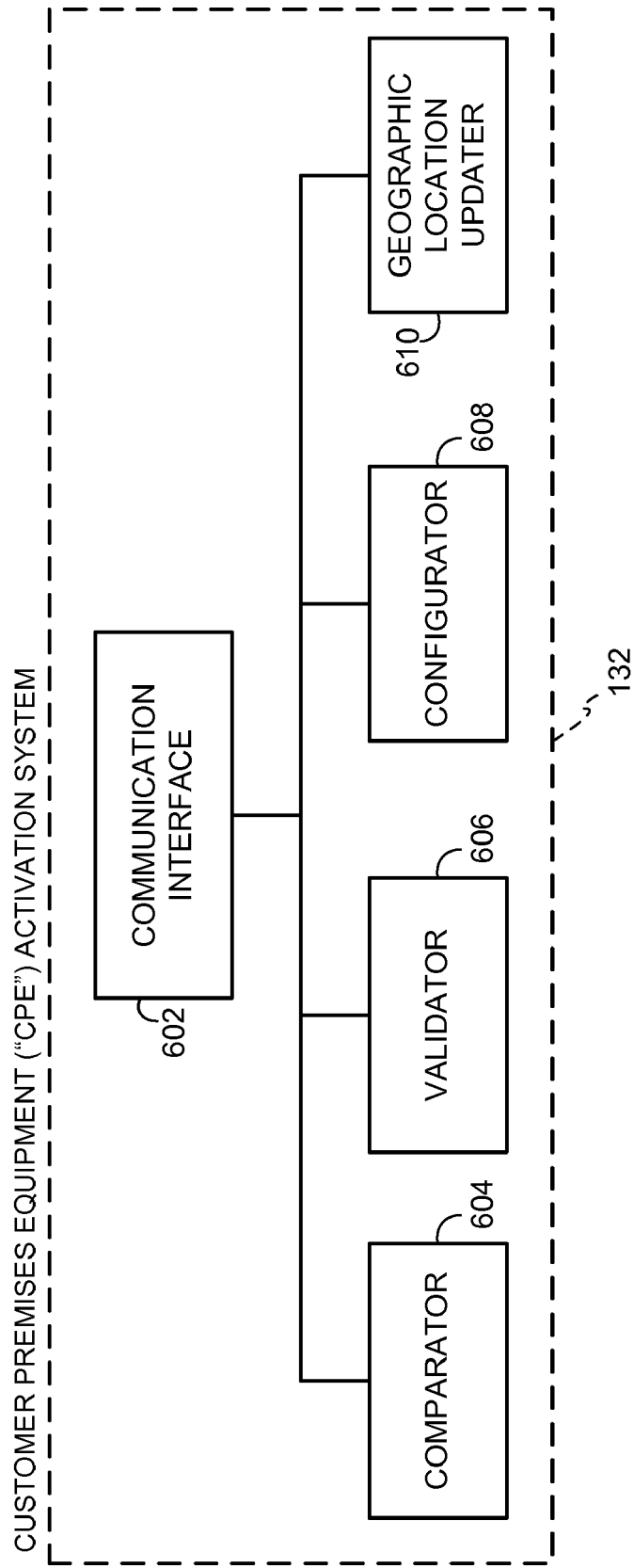
FIG. 6 is a detailed block diagram of an example customer premises equipment activation system communicatively coupled to the example network system of FIG. 1.

FIG. 6 is a detailed block diagram of the example CPE activation system 132 communicatively coupled to the example network system 100 of FIG. 1. The CPE activation system 132 may be implemented using any desired combination of hardware, firmware, and/or software. For example, one or more integrated circuits, discrete semiconductor components, or passive electronic components may be used. Additionally or alternatively, some or all of the blocks of the CPE activation system 132, or parts thereof, may be implemented using instructions, code, and/or other software and/or firmware, etc. stored on a machine accessible medium that, when executed by, for example, a processor system (e.g., the example processor system 910 of FIG. 9), perform the operations represented in the flow diagrams of FIGS. 8A-8C.

As shown in FIG. 6, the CPE activation system 132 includes a communication interface 602 to communicatively couple the CPE activation system 132 to the example network system 100 of FIG. 1 for transmitting and/or receiving data via the network system 100. The communication interface 602 may be implemented using a network interface card ("NIC") implemented using any suitable wired or wireless communication protocol (e.g., wired Ethernet, wireless Ethernet, Asynchronous Transfer Mode ("ATM"), etc.).

To compare IP addresses and/or MAC addresses, the CPE activation system 132 is provided with a comparator 604. For example, the CPE activation system 132 may use the comparator 604 to compare IP addresses of the site gateways 104a and 104b with IP addresses retrieved from the authentication and policy management system 134 of FIG. 1 to determine whether a VoIP device (e.g., the VoIP device 106) has changed network/geographic locations.

To validate MAC addresses (e.g., the MAC address 110 of FIG. 1), the CPE activation system 132 is provided with a validator 606. The CPE activation system 132 may use the validator 606 to determine whether a VoIP device (e.g., the VoIP device 106) is a valid device (e.g., has been authorized by a VoIP service provider to access the network system 100). For example, a VoIP service provider may store MAC addresses of authorized VoIP devices in the LDAP server 140 of FIG. 1. When a VoIP device is connected to a site gateway (e.g., the site gateways 104a and 104b), the CPE activation system 132 may use the validator 606 to determine whether the MAC address of the connected VoIP device is valid based on information (e.g., a response message indicating the validity of a MAC address) received from the LDAP server 140.

To update and/or generate configuration files (e.g., the configuration file 400 of FIG. 4), the CPE activation system 132 is provided with a configurator 608. When a new VoIP device is connected to the example network system 100 for the first time, the configurator 608 generates a configuration file for the new VoIP device to enable the VoIP device to access communication services of the example network system 100. When a previously connected VoIP device is reconnected to the example network system 100, the configurator 608 obtains existing configuration information (e.g., an existing configuration file) corresponding to the VoIP device and updates the configuration information according to the new location of the VoIP device and/or the new site gateway to which the VoIP device is connected.

To update geographic locations of VoIP devices (e.g., the VoIP device 106), the CPE activation system 132 is provided with a geographic location updater 610. In the illustrated example, when the CPE activation system 132 determines that a VoIP device has changed locations, the CPE activation system 132 uses the geographic location updater 610 to obtain new location information (e.g., a new geographic street address) and communicate the new location information to, for example, the LIS system 116 (FIG. 1).

Figure 7:
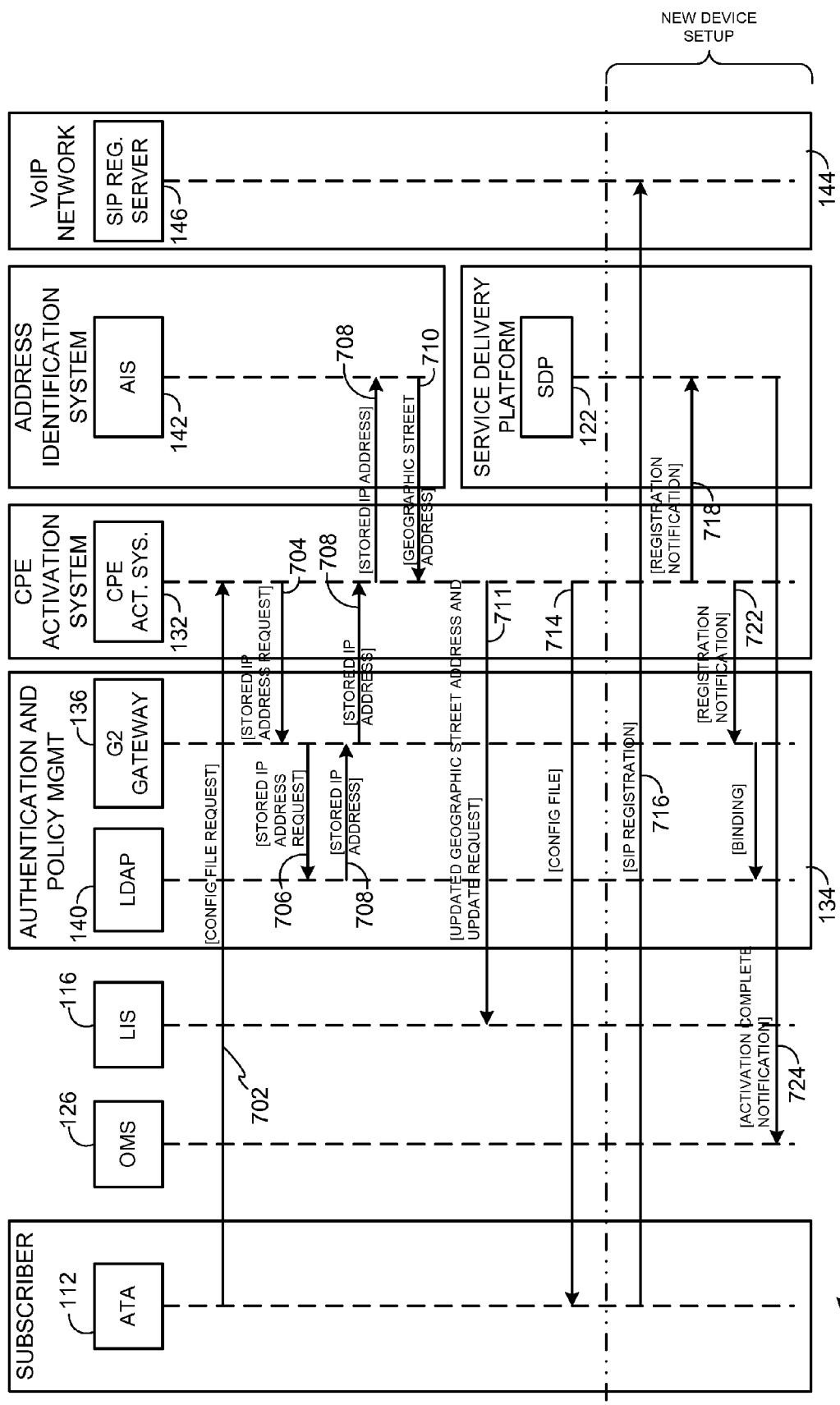
FIG. 7 depicts a timing diagram representative of information signals associated with updating geographic location information associated with IP devices for E-911 emergency services.
Figure 8A:
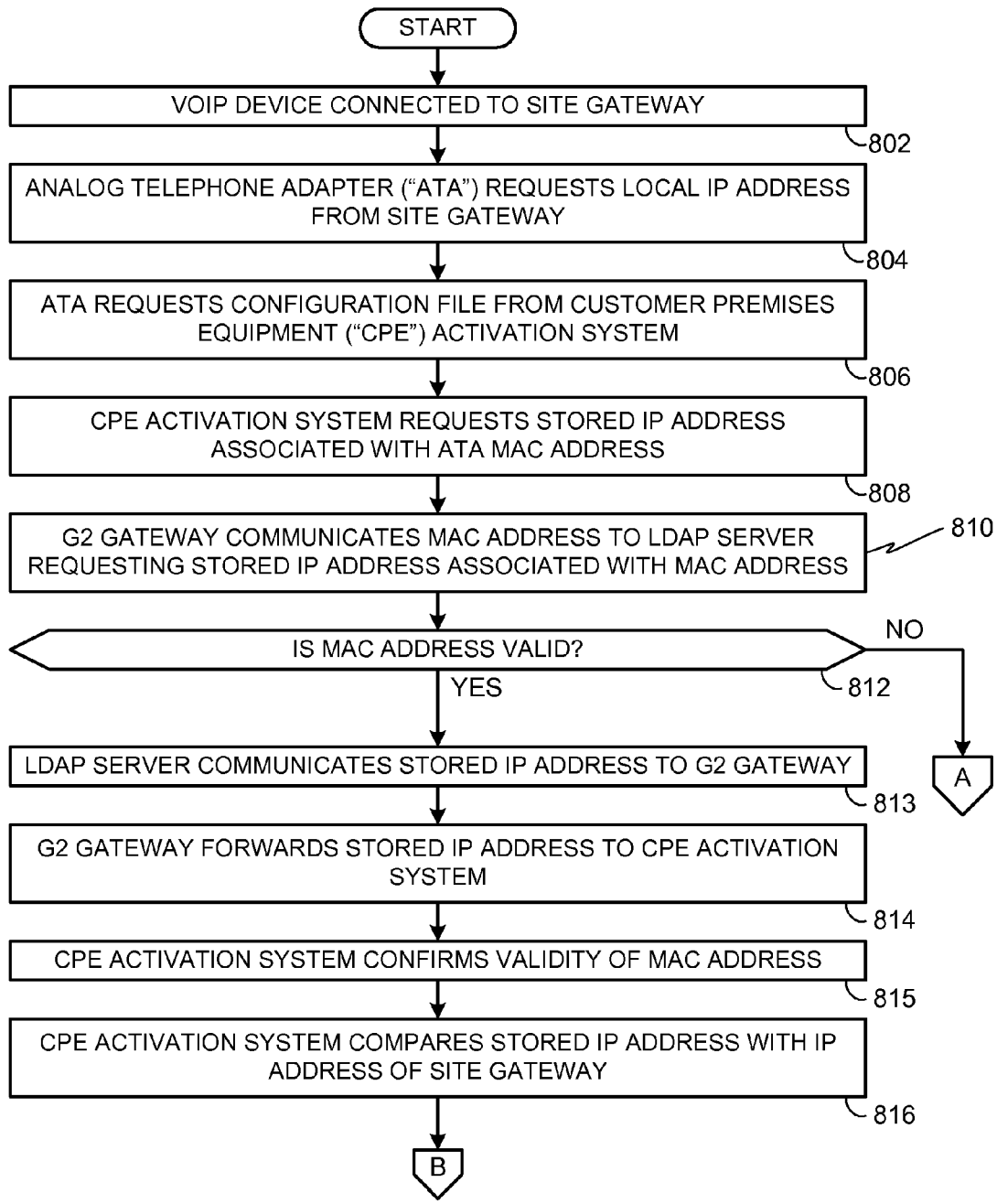
FIGS. 8A-8C are flowcharts representative of example machine readable instructions that may be executed to update geographic location information associated with IP devices for E-911 emergency services.
Figure 8B:
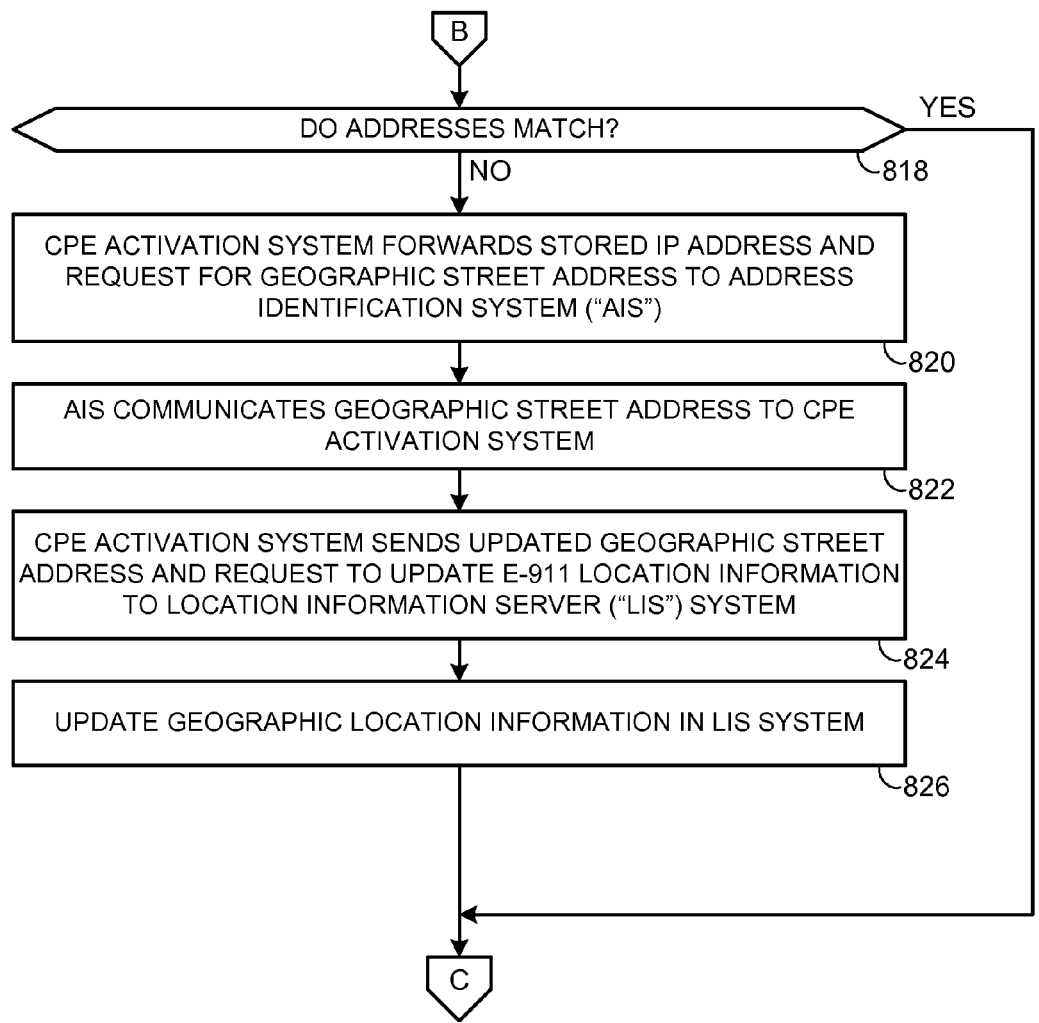
Figure 8C:
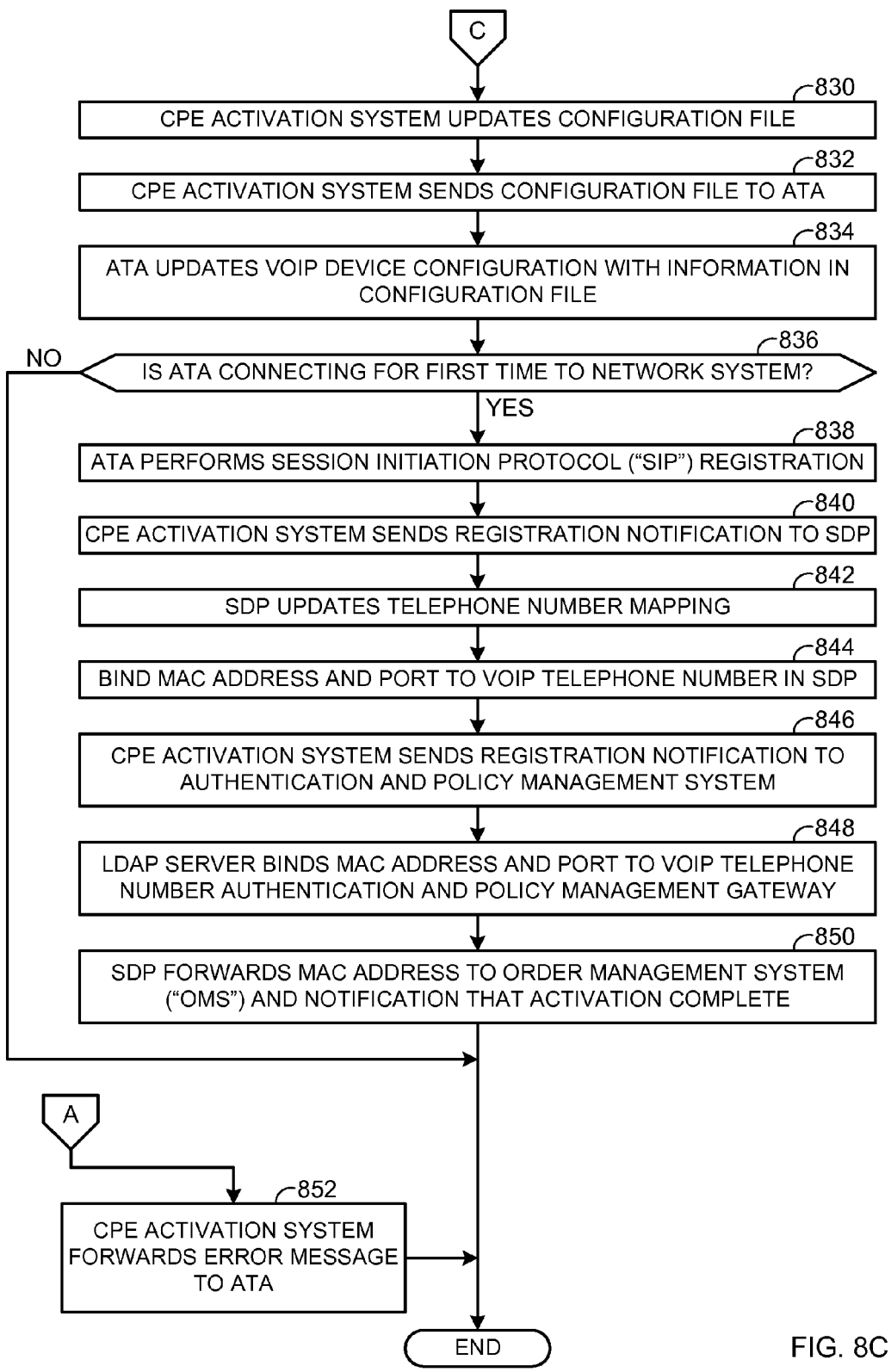

FIGS. 8A, 8B, and 8C are a flowchart representative of example machine readable instructions that may be executed to update geographic location information associated with Internet protocol devices (e.g., the VoIP device 106 of FIG. 1) for E-911 emergency services. The flowchart of FIGS. 8A-8C is described in connection with the example network system 100 illustrated in FIG. 1 and an example timing diagram 700 shown in FIG. 7. The example timing diagram 700 of FIG. 7 illustrates example timing relationships between the generation and transmission of information and requests within the example network system 100. Although example machine readable instructions for updating geographic location information associated with Internet protocol devices for E-911 emergency services are described with reference to the flowchart of FIGS. 8A-8C, persons of ordinary skill in the art will readily appreciate that other methods of updating geographic location information associated with Internet protocol devices for E-911 emergency services may additionally or alternatively be used. For example, the order of execution of the blocks depicted in the flowchart of FIGS. 8A-8C may be changed, and/or some of the blocks described may be rearranged, eliminated, or combined.

Turning to FIG. 8A, when the VoIP device 106 (FIGS. 1 and 6) is connected to a first site gateway (e.g., the site gateway 104a of FIG. 1) (block 802), the ATA 112 (FIGS. 2 and 7) corresponding to the VoIP device 106 requests a local IP address from the site gateway 104a (block 804). For example, the ATA 112 may automatically detect that it has been connected to the site gateway 104a and respond by sending the site gateway 104a the IP address request. Alternatively, the ATA 112 may send the IP address request to the site gateway 104a when a user first attempts to use the VoIP device 106. The site gateway 104a may then assign a local IP address (e.g., 192.168.xxx.xxx) to the ATA 112 using a dynamic host configuration protocol ("DHCP") and communicate the local IP address to the ATA 112. The local IP address is used by the ATA 112 to communicate within a local area network ("LAN") or an IP private branch exchange ("PBX") that is separated from portions of the example network system 100 by the site gateway 104a.

After receiving the local IP address from the site gateway 104a, the ATA 112 sends a configuration file request 702 (FIG. 7) to the CPE activation system 132 (FIGS. 1 and 6) requesting a configuration file (e.g., the example configuration file 400 of FIG. 4) from the CPE activation system 132 (block 806). In the illustrated example, the ATA 112 sends the configuration file request 702 to the CPE activation system 132 via the site gateway 104a. The configuration file request 702 includes the MAC address 110 (FIGS. 1-3) of the ATA 112. To deliver the configuration file request 702 to the CPE activation system 132, the site gateway 104a generates a communication packet including the configuration file request 702 and the IP address A of the site gateway 104a. In this manner, the CPE activation system 132 can use the MAC address 110 and the IP address A in the communication packet to determine to which site gateway the ATA 112 is connected.

In response, the CPE activation system 132 communicates a stored IP address request 704 (FIG. 7) to the authentication and policy management ("G2") gateway 136 (FIG. 1) requesting the IP address stored in association with the MAC address 110 of the ATA 112 in the LDAP server 140 (block 808). In the illustrated example, the stored IP address request 704 includes the MAC address 110 of the ATA 112, and the CPE activation system 132 uses the communication interface 602 (FIG. 6) to communicate the stored IP address request 704 to the G2 gateway 136. The G2 gateway 136 then communicates a stored IP address request 706 (FIG. 7) to the LDAP 140 including the MAC address 110 and the request for the stored IP address associated with the MAC address 110 (block 810).

The LDAP server 140 then determines if the MAC address 110 is valid (block 812). For example, the LDAP server 140 may determine that the MAC address 110 is valid if one of the data records stored in a database of the LDAP server 140 includes the MAC address 110. The MAC address 110 may be stored in the LDAP server 140 if new services for the ATA 112 have recently been provisioned or if the ATA 112 has previously been connected to the example network system 100 and is authorized to access services via the example network system 100. For example, if the VoIP device 106 was previously connected to the second site gateway 104b, the MAC address 110 of the VoIP device 106 will be stored in the authentication and policy management system 134 in association with the IP address B of the second site gateway 104b. If the LDAP server 140 determines that the MAC address 110 is valid (block 812), the LDAP server 140 communicates a stored IP address 708 (FIG. 7) associated with the MAC address 110 to the G2 gateway 136 (block 813) and the G2 gateway 136 forwards the stored IP address 708 to the CPE activation system 132 (block 814).

The CPE activation system 132 then uses the validator 606 (FIG. 6) to confirm the validity of the MAC address 110 by determining that the LDAP server 140 forwarded the stored IP address 708 instead of, for example, an error message, a null value, etc. (block 815). In some example implementations, the CPE activation system 132 may also determine if the VoIP device 106 is enabled for roaming (e.g., enabled for registering on the example network system 100 from more than one geographic location) by, for example, accessing a subscriber's account/service information. If the VoIP device 106 is not enabled for roaming, the CPE activation system 132 may deny registration of the VoIP device 106 at the new geographic location and may deny VoIP service to the VoIP device 106.

The CPE activation system 132 then uses the comparator 604 (FIG. 6) to compare the stored IP address 708 with the IP address A of the site gateway 104a (block 816). Finding a non-match between the stored IP address 708 retrieved from the LDAP server 140 and the IP address A of the site gateway 104a to which the VoIP device 106 is currently connected signifies that the VoIP device 106 has been moved (i.e., the VoIP device 106 has been disconnected from a previously connected site gateway and moved to another site gateway). A geographic location update is, therefore, appropriate to indicate the new geographic location of the VoIP device 106.

Turning to FIG. 8B, in the case that the VoIP device 106 is eligible for roaming, if the CPE activation system 132 determines that the stored IP address 708 does not match the IP address A of the site gateway 104a to which the VoIP device 106 is currently attached (block 818), then to update the geographic location information associated with the VoIP device 106, the geographic location updater 610 (FIG. 6) of the CPE activation system 132 forwards the stored IP address 708 to the AIS 142 and a request for the geographic street address associated with the stored IP address 708 (block 820). In response, the AIS 142 communicates an updated geographic street address 710 (FIG. 7) to the CPE activation system 132 (block 822). The CPE activation system then sends the LIS system 116 (FIGS. 1 and 7) the updated geographic street address and a request to update the E-911 location information 711 (FIG. 7) (block 824). The LIS system 116 then updates the geographic location information corresponding to the MAC address 110 stored therein (block 826). In this manner, the geographic location of the VoIP device 106 can be determined when E-911 calls originate from the VoIP device 106.

Turning to FIG. 8C, if at block 818, the CPE activation system 132 determines that the stored IP address corresponding to the MAC address 110 of the VoIP device 106 matches the IP address A of the site gateway 104a to which the VoIP device 106 is currently coupled, the configurator 608 (FIG. 6) of the CPE activation system 132 updates the configuration file 714 (FIG. 7) (e.g., the example configuration file 400 of FIG. 4) associated with the ATA 112 (block 830). In the illustrated example, the configuration file 714 is stored in the CPE activation system 132 from a previous time that the ATA 112 was connected to the example network system 100. Alternatively, for ATA's being connected to the network for the first time, configuration information for those devices may be communicated to the CPE activation system 132 on, for example, a daily basis as part of a service provisioning process. In this manner, when the newly added ATA's are connected to the network, the CPE activation system 132 may use the configuration information received via the service provisioning process to generate configuration files for the ATA's.

The CPE activation system 132 then sends configuration file 714 to the ATA 112 (block 832), and the ATA 112 updates the configuration of the VoIP device 106 with information in the configuration file 714 (block 834). In some example implementations, the CPE activation system 132 may generate an encryption key and encrypt the configuration file 714 prior to sending it to the ATA 112. In addition, the CPE activation system 132 may be configured to determine whether the requesting caller is valid (e.g., the caller has an order for service placed or is otherwise registered with the service provider), whether the MAC address 110 is valid, and/or whether the requesting subscriber has actually ordered the requested service (e.g., VoIP service). In this manner, if the CPE activation system 132 determines that the subscriber is invalid, the MAC address is invalid, and/or the subscriber has not ordered the requested service (e.g., a roaming service), the CPE activation system 132 may deny forwarding a configuration file to the ATA 112, thereby denying VoIP service to the VoIP device 106.

The ATA 112 then determines whether it is the first time that it has been connected to the example network system 100 (block 836). If the ATA 112 determines that it is the first time it has connected to the example network system 100 (block 836), the ATA performs a SIP registration 716 (FIG. 7) with the SIP registration server 130 (FIGS. 1 and 7) (block 838), and the CPE activation system 132 sends a registration notification 718 to the SDP 122 (FIGS. 1 and 7) (block 840). In response to the registration notification 718, the SDP 122 updates the telephone number mapping of the telephone number of the VoIP device 106 (block 842). For example, the SDP 122 may update the telephone number mapping in a domain name server ("DNS") (not shown) associated with the site gateway 104a using an ENUM protocol that defines a DNS-based architecture and protocols for mapping telephone numbers to uniform resource identifiers ("URI") that can be used to route a call to one or more VoIP devices.

The SDP 122 then binds the MAC address 110 and the port of the site gateway 104a to the telephone number of the VoIP device 106 in the SDP 122 (block 844). The SDP 122 then sends a registration notification 722 (FIG. 7) to the G2 gateway 136 of the authentication and policy management system 134 (block 846). The authentication and policy management gateway 136 (FIGS. 1 and 7) then binds the MAC address 110 and the port of the site gateway 104a to the telephone number of the VoIP device 106 in the LDAP server 140 (block 848). The SDP 122 then forwards the MAC address 110 to the OMS 126 (FIGS. 1 and 7) via, for example, an activation complete notification 724 (FIG. 7) (block 850). After the SDP 122 forwards the activation complete notification 724 to the OMS 126 at block 846, or, if at block 836, the ATA 112 determines that it is not connecting to the example network system 100 for the first time, or, if at block 812, the LDAP server 140 determines that the MAC address 110 is not valid and the CPE activation system 132 forwards an error message to the ATA 112 (block 852), the process of FIGS. 8A-8C is ended. At block 852, the CPE activation system 132 may forward the error message to the ATA 112 after the validator 606 (FIG. 6) determines that the CPE activation system 132 did not receive a stored IP address or received an error message instead of the stored IP address from the LDAP server 140 in response to the stored IP address request 704 (FIG. 7) of block 808.

Although the example methods and systems are described above in connection with the VoIP device 106 roaming within a single service provider network, in other example implementations, the example methods and systems may be used to update geographic location information associated with the VoIP device 106 when the VoIP device 106 roams from one service provider network to another service provider network. For example, different service providers may share information (e.g., geographic street addresses, VoIP device MAC addresses, site gateway IP addresses, site gateway ID's, etc.) stored in one or more data structures (e.g., the LIS system 116 of FIGS. 1 and 7, the LDAP server 140 of FIGS. 1 and 7, etc.). In this manner, a service provider may update geographic location information associated with a roaming VoIP device that is connected to that service provider's network but that is not associated with a service subscription of that service provider.

Figure 9:
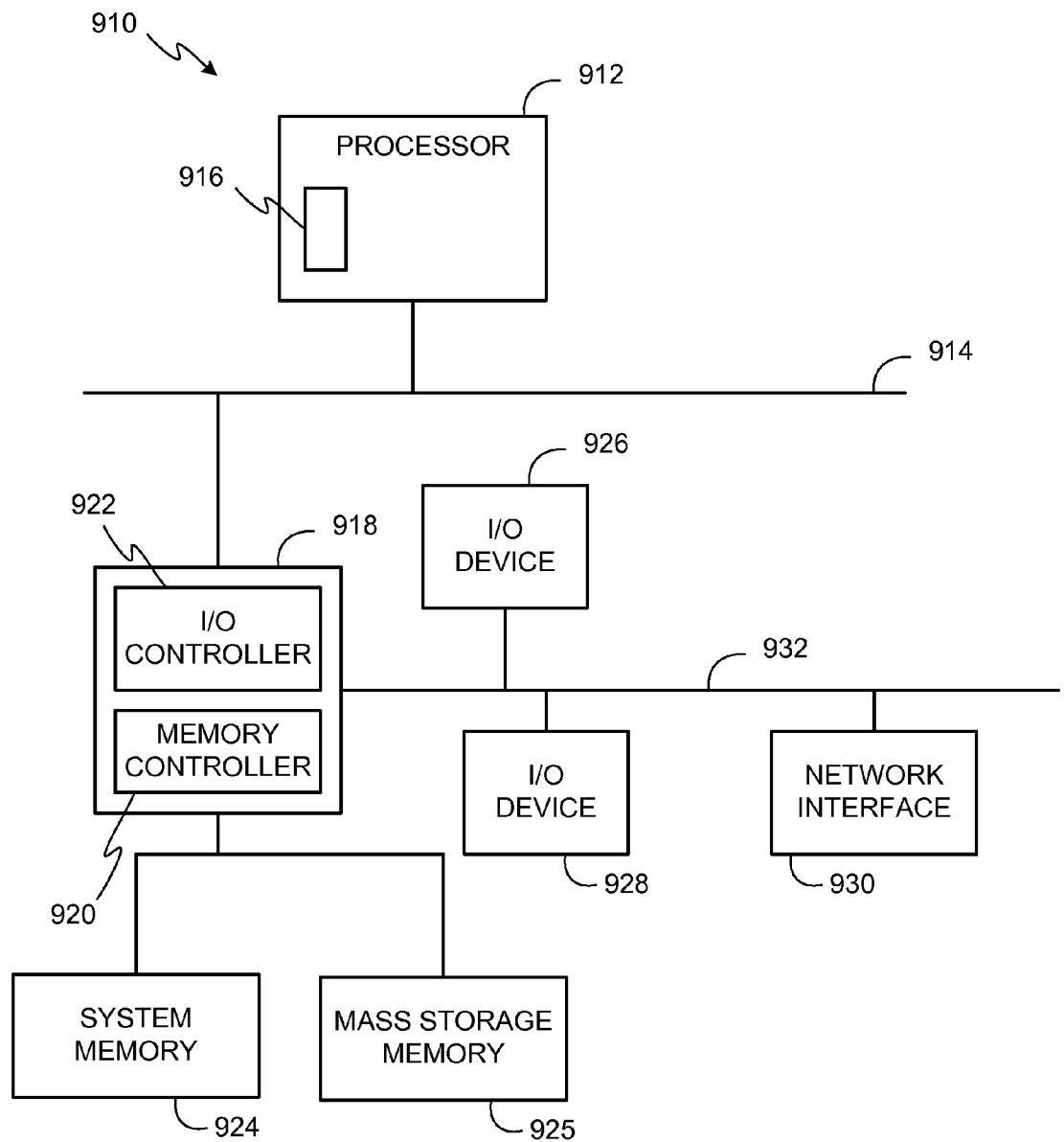
FIG. 9 is a block diagram of an example processor system that may be used to execute the example machine readable instructions of FIGS. 8A-8C to implement the example systems and/or methods described herein.

FIG. 9 is a block diagram of an example processor system 910 that may be used to implement the example apparatus, methods, and articles of manufacture described herein. For example, processor systems substantially similar or identical to the example processor system 910 may be used to implement the site gateways 104a-b, the VoIP device 106, the automatic location identification ("ALI") server 118, the service delivery platform ("SDP") 122, the order management system ("OMS") 126, the service order administration ("SOA") system 128, the authentication and policy management system 134, the session initiation protocol ("SIP") registration server 130, and/or the customer premises equipment ("CPE") activation system 132, all shown in FIG. 1.

As shown in FIG. 9, the processor system 910 includes a processor 912 that is coupled to an interconnection bus 914. The processor 912 includes a register set or register space 916, which is depicted in FIG. 9 as being entirely on-chip, but which could alternatively be located entirely or partially off-chip and directly coupled to the processor 912 via dedicated electrical connections and/or via the interconnection bus 914. The processor 912 may be any suitable processor, processing unit or microprocessor. Although not shown in FIG. 9, the system 910 may be a multi-processor system and, thus, may include one or more additional processors that are identical or similar to the processor 912 and that are communicatively coupled to the interconnection bus 914.

The processor 912 of FIG. 9 is coupled to a chipset 918, which includes a memory controller 920 and an input/output (I/O) controller 922. A chipset provides I/O and memory management functions as well as a plurality of general purpose and/or special purpose registers, timers, etc. that are accessible or used by one or more processors coupled to the chipset 918. The memory controller 920 performs functions that enable the processor 912 (or processors if there are multiple processors) to access a system memory 924 and a mass storage memory 925.

The system memory 924 may include any desired type of volatile and/or non-volatile memory such as, for example, static random access memory (SRAM), dynamic random access memory (DRAM), flash memory, read-only memory (ROM), etc. The mass storage memory 925 may include any desired type of mass storage device including hard disk drives, optical drives, tape storage devices, etc.

The I/O controller 922 performs functions that enable the processor 912 to communicate with peripheral input/output (I/O) devices 926 and 928 and a network interface 930 via an I/O bus 932. The I/O devices 926 and 928 may be any desired type of I/O device such as, for example, a keyboard, a video display or monitor, a mouse, etc. The network interface 930 may be, for example, an Ethernet device, an asynchronous transfer mode (ATM) device, an 802.11 device, a digital subscriber line (DSL) modem, a cable modem, a cellular modem, etc. that enables the processor system 910 to communicate with another processor system.

While the memory controller 920 and the I/O controller 922 are depicted in FIG. 9 as separate functional blocks within the chipset 918, the functions performed by these blocks may be integrated within a single semiconductor circuit or may be implemented using two or more separate integrated circuits.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above-described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such devices are periodically superseded by different, faster, and/or more efficient systems having the same general purpose. Accordingly, replacement devices, standards and/or protocols having the same general functions are equivalents which are intended to be included within the scope of the accompanying claims.

Although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. A method of enabling 911 services to an internet protocol communication device, the method comprising:
   receiving a media access control address associated with the internet protocol communication device and a first internet protocol address associated with a gateway through which the internet protocol communication device is obtaining network access;
   retrieving a second internet protocol address associated with the media access control address;
   comparing the entire first internet protocol address with the entire second internet protocol address; and
   when the entire first internet protocol address does not match the entire second internet protocol address, associating the media access control address with the first internet protocol address in a database to designate a geographic location of the internet protocol communication device.

2. A method as defined in claim 1, wherein the database is external to a virtual local area network in which the internet protocol communication device is communicatively coupled to the gateway.

3. A method as defined in claim 1, wherein the database is external to an internet protocol private branch exchange system in which the internet protocol communication device is communicatively coupled to the gateway.

4. A method as defined in claim 1, wherein the internet protocol communication device comprises at least one of an internet protocol telephone, an internet protocol data communicator, a personal desktop computer having voice over internet protocol capabilities, or a personal laptop computer having voice over internet protocol capabilities.

5. A method as defined in claim 1, wherein the second internet protocol address is associated with a second geographic location.

6. A method as defined in claim 1, wherein the database is associated with a location identification server accessible by a 911 dispatcher.

7. A method as defined in claim 1, further comprising determining whether the internet protocol communication device associated with the media access control address is eligible for association with the geographic location.

8. A method as defined in claim 7, further comprising denying service to the internet protocol communication device if the internet protocol communication device is ineligible for association with the geographic location.

9. A method as defined in claim 1, wherein the second internet protocol address is associated with a second gateway.

10. A method as defined in claim 1, further comprising determining whether the media access control address is valid.

11. A method as defined in claim 10, further comprising denying service to the internet protocol communication device if the media access control address is invalid.

12. A method as defined in claim 1, wherein comparing the first internet protocol address with the second internet protocol address comprises determining whether the first internet protocol address is stored in the database in association with the internet protocol communication device.

13. A method as defined in claim 1, wherein comparing the first internet protocol address with the second internet protocol address comprises determining whether the internet protocol communication device has been moved to a new geographic location.

14. A method as defined in claim 1, wherein the first and second internet protocol addresses are associated with the same service provider network.

15. A tangible machine accessible medium having instructions stored thereon that, when executed, cause a machine to at least:
   receive a media access control address associated with an internet protocol communication device and a first internet protocol address associated with a gateway through which the internet protocol communication device is obtaining network access;
   retrieve a second internet protocol address associated with the media access control address;
   compare the entire first internet protocol address with the entire second internet protocol address; and
   when the entire first internet protocol address does not match the entire second internet protocol address, associating the media access control address with the first internet protocol address in a database to designate a geographic location of the internet protocol communication device.

16. A machine accessible medium as defined in claim 15, wherein the internet protocol communication device comprises at least one of an internet protocol telephone, an internet protocol data communicator, a personal desktop computer having voice over internet protocol capabilities, or a personal laptop computer having voice over internet protocol capabilities.

17. A machine accessible medium as defined in claim 15, wherein the database is associated with a location identification server accessible by a 911 dispatcher.

18. An apparatus to enable 911 services to an internet protocol communication device, the apparatus comprising:
   a communication interface to receive a media access control address associated with the internet protocol communication device and a first internet protocol address associated with a gateway through which the internet protocol communication device is obtaining network access;
   a comparator to compare the entire first internet protocol address with an entire second internet protocol address associated with the media access control address; and
   a geographic location updater to provide an updated geographic location of the internet protocol communication device based on the media access control address when the entire first internet protocol address does not match the entire second internet protocol address.

19. An apparatus as defined in claim 18, wherein the communication interface communicates a configuration request to a configuration information provider when the first internet protocol address matches the second internet protocol address.

20. An apparatus as defined in claim 18, further comprising a validator communicatively coupled to the communication interface and configured to determine whether the media access control address is valid.

21. An apparatus as defined in claim 18, wherein the communication interface receives the media access control address from an authentication and policy management system.

* * * * *